US007688825B2

(12) United States Patent
Shimizu (10) Patent No.: US 7,688,825 B2
(45) Date of Patent: Mar. 30, 2010

(54) FILTERING FRAMES AT AN INPUT PORT OF A SWITCH

(75) Inventor: Takeshi Shimizu, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 971 days.

(21) Appl. No.: 11/278,751

(22) Filed: Apr. 5, 2006

(65) Prior Publication Data

US 2006/0227777 A1 Oct. 12, 2006

Related U.S. Application Data

(60) Provisional application No. 60/670,369, filed on Apr. 12, 2005.

(51) Int. Cl.
*H04L 12/28* (2006.01)
*H04L 12/56* (2006.01)
(52) U.S. Cl. .................. 370/392; 370/389; 370/395.31
(58) Field of Classification Search .................. 370/389, 370/395.51, 392
See application file for complete search history.

(56) References Cited

U.S. PATENT DOCUMENTS

| 5,872,783 | A | * | 2/1999 | Chin ..................... 370/395.32 |
|---|---|---|---|---|
| 6,922,749 | B1 | | 7/2005 | Gil et al. ..................... 710/316 |
| 6,934,283 | B1 | | 8/2005 | Warner ....................... 370/380 |
| 7,023,853 | B1 | * | 4/2006 | Bechtolsheim et al. ...... 370/392 |
| 7,310,306 | B1 | * | 12/2007 | Cheriton ..................... 370/218 |
| 7,440,467 | B2 | * | 10/2008 | Gallatin et al. .............. 370/401 |
| 2001/0005369 | A1 | | 6/2001 | Kloth ........................ 370/392 |
| 2002/0161923 | A1 | | 10/2002 | Foster et al. ................ 709/239 |
| 2002/0184529 | A1 | | 12/2002 | Foster et al. ................ 713/201 |
| 2003/0131131 | A1 | | 7/2003 | Yamada et al. .............. 709/238 |
| 2004/0003184 | A1 | * | 1/2004 | Safranek et al. ............. 711/146 |
| 2004/0213237 | A1 | * | 10/2004 | Yasue et al. .................. 370/392 |
| 2005/0053006 | A1 | | 3/2005 | Hongal et al. ............ 370/236.2 |
| 2005/0089049 | A1 | * | 4/2005 | Chang et al. ................. 370/396 |
| 2005/0180345 | A1 | * | 8/2005 | Meier .......................... 370/310 |
| 2005/0192013 | A1 | * | 9/2005 | Perrot et al. ................. 455/445 |

FOREIGN PATENT DOCUMENTS

WO   WO 01/43354 A2   6/2001

OTHER PUBLICATIONS

EPO European Search Report for Application No./Patent No. 06007589.2-1249, Reference No. 114 628 a/npo, Applicant: Fujitsu Ltd., 13 pages, May 2, 2007.

Pending U.S. Appl. No. 11/394,892, entitled "Purge Mechanism in Link Aggregation Group Management," by Yukihiro Nakagawa et al., 32 pages plus 6 pages of drawing, filed Mar. 31, 2006.

(Continued)

*Primary Examiner*—Ayaz R Sheikh
*Assistant Examiner*—Tarell Hampton
(74) *Attorney, Agent, or Firm*—Baker Botts L.L.P.

(57) ABSTRACT

A switch includes multiple ports for transmitting and receiving frames and a switching core for switching frames between the ports. One or more of the ports locally store filtering information, allowing the ports to filter frames without accessing central elements of the switch. For example, a port's filtering information may indicate drop conditions, and upon receiving a frame that corresponds to a drop condition in the filtering information, the port can locally drop the frame without impacting other elements of the switch.

20 Claims, 3 Drawing Sheets

OTHER PUBLICATIONS

Pending U.S. Appl. No. 11/394,960, entitled "Special Marker Message for Link Aggregation Marker Protocol," by Yukihiro Nakagawa et al., 32 pages plus 6 pages of drawings, filed Mar. 31, 2006.

Pending U.S. Appl. No. 11/394,908, entitled "Distribution-Tuning Mechanism for Link Aggregation Group Management" by Yukihiro Nakagawa et al., 32 pages plus 6 pages of drawings, filed Mar. 31, 2006.

Pending U.S. Appl. No. 11/398,257, entitled "Network Based Routing Scheme," by Takeshi Shimizu, 34 pages plus 5 pages of drawings, filed Apr. 4, 2006.

Roscoe et al., "Predicate Routing: Enabling Controlled Networking," ACM SIGCOMM Computer Communications Review, XP-001224681, vol. 33, No. 1, pp. 65-70, Jan. 2003.

EPO European Search Report for Application No./Patent No. 06007587.6-2416, Reference No. 114 663 a/lga, Applicant: Fujitsu Ltd., 4 pages, Jan. 8, 2006.

Chinese Government letter to Beijing Sanyou Intellectual Property Agency, Ltd., Examiner's First Notification of Office Action on Patent Application No. 200610072125.0, 10 pages, Oct. 10, 2008.

Chinese Government letter to Beijing Sanyou Intellectual Property Agency, Ltd., Examiner's First Notification of Office Action on Patent Application No. 200610072127.0, 12 pages Oct. 17, 2008.

* cited by examiner

FILTERING FRAMES AT AN INPUT PORT OF A SWITCH

RELATED APPLICATION

This Application claims the benefit under 35 U.S.C. §119 (e) of U.S. Provisional Application Ser. No. 60/670,369 entitled "Link Aggregation and Network Management Techniques," filed on Apr. 12, 2005 and incorporated by reference herein.

TECHNICAL FIELD OF THE INVENTION

The present invention relates generally to network communications and, more particularly, to filtering frames at an input port of a switch.

BACKGROUND OF THE INVENTION

Within networks, switches route network traffic among different network components. These switches typically maintain databases that indicate how traffic is to be handled.

SUMMARY OF THE INVENTION

In accordance with the present invention, techniques for filtering certain frames at an input port of a switch are provided. According to particular embodiments, these techniques describe a method and apparatus for filtering frames at an input port by enabling frame drop decisions at the input port. An input port may store filtering information and make certain filtering decisions, which may include, for example, decisions to drop frames with VLAN addressing violations.

According to a particular embodiment, a switching device comprises a plurality of ports. Each port comprises a cache, which has one or more filtering entries. Each port is able to receive a frame, which includes a payload and a header that specifies addressing information. Each port is also able to determine whether the addressing information corresponds to one of the filtering entries, to drop the frame if the addressing information corresponds to one of the filtering entries, and to forward the frame to a switching core if the addressing information does not correspond to one of the filtering entries. The switching device also comprises a switching core. The switching core has a frame buffer, which is able to store the frames forwarded from the ports. The switching device also comprises a forwarding database, which is able to maintain a plurality of routing entries. Each routing entry indicates at least one of: an outbound one of the ports and a drop condition. The switching device also comprises a controller. For each of the frames in the frame buffer, the controller is able to identify the addressing information from the header of the frame, to identify one of the routing entries in the forwarding database corresponding to the addressing information, to forward the frame to the indicated outbound one of the ports if the corresponding routing entry indicates an outbound one of the ports, and, if the corresponding routing entry indicates a drop condition, to drop the frame and to communicate a cache update indicating the drop condition to the one of the ports that received the frame.

Embodiments of the invention provide various technical advantages. For example, these techniques may provide a mechanism by which the input ports of a switch can drop invalid frames without having to access a central or shared component of the switch. With the input ports able to drop frames, the number of accesses to a forwarding database of the switch could be reduced. In some embodiments, the memory requirements of a frame buffer in the switch are reduced. In general, the frame buffer stores the frame while the switch determines the appropriate outbound port or ports for the frame. By enabling frame drop decisions at the input ports, the frame buffer avoids storing certain frames that the switch will determine need to be dropped. Thus, the size requirements of the frame buffer may be reduced. In particular embodiments, the filtering information stored by the input port is selected to reduce usage of the forwarding database and the frame buffer while also minimizing the size of the input port. Additionally, in certain embodiments, reduction in the number of accesses to the forwarding database increases throughput of the switch. Finally, in particular embodiments, a switch core maintains the coherency between the forwarding database and the cache in each of the ports. Thus, devices and elements can update the forwarding database without having to update the caches located at the input ports.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
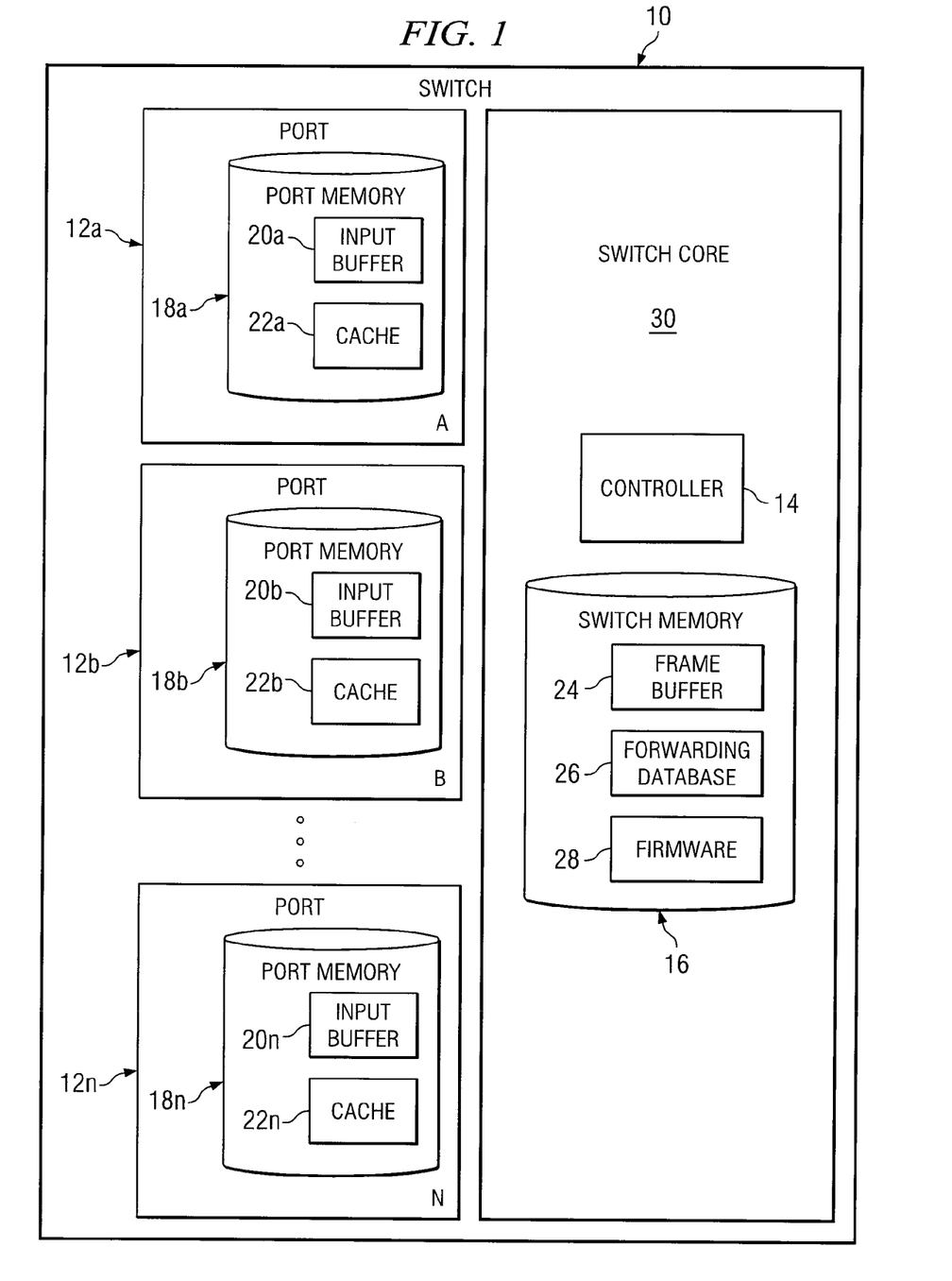
FIG. 1 illustrates a switch that provides enhanced filtering of frames by filtering frames at an input port of the switch.

FIG. 1 illustrates a switch, indicated generally at 10, that provides enhanced filtering of frames by filtering frames at an input port of switch 10. As illustrated, switch 10 includes ports 12 and switch core 30, which includes controller 14 and switch memory 16. Switch 10 may also include a switching fabric, not illustrated, that provides connections to facilitate the transmission of frames from any one port 12 to switch core 30, controller 14, switch memory 16, and any or all ports 12 within switch 10. Switch core 30 also may include switching fabric and any suitable elements for transferring frames between ports. In general, elements within switch 10 interoperate to filter some frames at ports 12 by allowing ports 12 to make particular filtering decisions.

Each port 12 represents hardware, including any appropriate controlling logic, for transmitting and receiving frames. For example, port 12 may include an input module and an output module for receiving and transmitting frames. The term frame, as used within this description, refers to any segmentation of information that includes addressing information. For example, frames may encompass Ethernet frames, internet protocol (IP) packets, asynchronous transmission mode (ATM) cells, and/or any other suitable information segments.

As illustrated, each port 12 includes a port memory 18, which includes an input buffer 20 and a cache 22. Input buffer 20 stores frames received by the corresponding port 12. In some embodiments, frames are stored by input buffer 20 until the frame can be sent to and stored in switch memory 16. Input buffer 20 may store frames until port 12 can process the frames. In particular embodiments, the header of the frame is processed while the frame is being received by port 12. Thus, a drop decision may be made based upon the header without the need to store the frame in input buffer 20. While depicted as one logical block in port memory 18, it is understood that this is a logical depiction and input buffer 20 can be structured and can operate in any way to buffer frames received by port 12.

Cache 22 maintains filtering information to enable frame filtering decisions at port 12. In particular embodiments, cache 22 receives filtering information from the forwarding database 26, located in switch memory 16. Cache 22 may store filtering information in a variety of different ways. For example, filtering information can be organized into entries that contain drop conditions. In some embodiments, entries are stored in a table, database, or file(s). In particular embodiments, the entries in cache 22 correspond to addresses that may be stored in the headers of frames. In some embodiments, each entry specifies a particular action to be taken upon satisfaction of that filtering condition, while in other embodiments, port 12 performs the same action for satisfaction of any entry. In particular embodiments, the drop conditions may indicate that an action should be taken, such as: drop frame, drop frame if the frame is not a Bridge Protocol Data Unit (BPDU) frame (i.e. a configuration frame), drop frame but allow learning, etc. For example, a drop condition in a particular entry in cache 22 could indicate that all frames satisfying that filtering condition should be dropped without any further action. A different drop condition in another entry in cache 22 could indicate that all frames satisfying that filtering condition should be dropped and the source address should be sent to switch core 30 to allow learning.

Cache 22 may be any of a variety of different lengths. In some embodiments, the number of entries in cache 22 is chosen to minimize the overall size of switch 10. In particular embodiments, the size of cache 22 is set to a given number, for example allowing only four entries. Using a relatively small cache 22 in combination with other appropriately sized elements can permit virtually all elements of a high-speed switch to be implemented on a single chip, potentially operating at speed at or above ten gigabits per second. In certain embodiments, the filtering information in cache 22 specifies frame filtering conditions for information contained in the frame's header.

In some embodiments, cache 22 maintains filtering conditions corresponding to one or more virtual local area networks (VLANs). To identify frame violations, cache 22 may maintain a list or collection of VLAN addresses that violate filtering conditions. For example, cache 22 may contain a table specifying for each entry a VLAN ID, a port state, and a valid bit. Entries in cache 22 typically mirror selected information from forwarding database 26. While examples of cache 22 have been described, it is to be understood that cache 22 can be structured and can operate in any appropriate manner to maintain information that enables the corresponding port 12 to make frame filtering decisions.

In operation, port 12 receives a frame and stores the frame in input buffer 20. Port 12 then accesses cache 22 to determine whether an entry in cache 22 corresponds to information in the frame's header. In some embodiments, each entry in cache 22 corresponds to a VLAN address. Port 12 determines whether any addresses contained in the header of the frame correspond to any entries in cache 22. If an address in the header corresponds to an entry in cache 22, port 12 acts on the frame as indicated by the entry in cache 22. In particular embodiments, cache 22 only contains entries specifying situations when a frame should be dropped. For example, cache 22 may contain a list of VLAN addresses that violate filtering conditions associated with that port. In these cases, if an address in the frame's header corresponds to an entry in cache 22, then input port 12 drops the frame. Port 12 may remove the frame from input buffer 20 or otherwise indicate that the frame is dropped. On the other hand, if port 12 does not find an entry in cache 22 corresponding to any addresses in the frame's header, then the frame is sent to switch core 30, whose operations will be described below.

While port 12 is depicted as a single element containing a particular configuration and arrangement of modules, it should be noted that this is a logical depiction, and the components and functionality of port 12 may be provided by any suitable collection and arrangement of components. The functions performed by the various components of port 12 may be accomplished by any suitable devices or elements to send and receive frames and make frame filtering decisions.

In general, controller 14 manages the operation of switch 10. For example, controller 14 may manage the transfer of frames between ports 12 and switch core 30, access switch memory 16 to determine the appropriate outbound ports 12 for received frames, and determine drop conditions for frames based on information stored in switch memory 16. As a particular example, controller 14 may manage the transfer of a received frame from the receiving port 12 into the switch core 30, identify information in the header of the frame that violates filtering conditions stored in switch memory 16, and instruct the dropping of the frame.

As illustrated, switch 10 includes at least three ports 12: port 12a, port 12b, and port 12n. Each port 12 is operable to independently receive and process information received by it. In some embodiments, switch 10 is configured to operate in an environment employing virtual local area networks (VLANs). In a VLAN environment, ports 12 may belong to different VLANs. Controller 14 may drop frames with VLAN addresses that violate filtering conditions stored by switch memory 16. A frame may violate filtering conditions by having an ingress violation, an egress violation, a protocol violation, such as a Multiple Spanning Tree Protocol (MSTP) port state violation, or any other violation monitored by switch 10.

As an example, consider port 12a and port 12b belonging to one VLAN—"group A"; port 12b and port 12n belonging to a different VLAN—"group B"; and port 12n belonging to a third VLAN—"group C". If port 12a receives a frame whose header specifies a source address in VLAN group C, the frame has an ingress violation since port 12a only belongs to VLAN group A. After receiving the frame, port 12a may access cache 22a to determine whether one or more addresses in the frame's header have a corresponding entry in cache 22a. If no corresponding entry is found, port 12a forwards the frame to switch core 30, which stores the frame in switch memory 16. Controller 14, after accessing switch memory 16 and identifying that the frame has an ingress violation, instructs switch core 30 to drop the frame.

As another example, port 12b receives a frame destined for VLAN group B when port 12b is in a learning state for VLAN group B. In the learning state, an incoming frame may be dropped even though switch 10 may learn the source address of the frame and add or modify an entry in forwarding database 26 to include the source address. After receiving the frame, port 12b checks cache 22b, which may indicate that the frame should be dropped but the source address from the frame should be sent to forwarding database 26 for learning.

On the other hand, when port 12*b* receives a frame destined for VLAN group A, port 12*b* checks cache 22*b*. If no information for VLAN group A is found in cache 22*b*, then the frame is forwarded to switch core 30.

In particular embodiments, controller 14 may also update the filtering information stored by cache 22. Continuing with the example above, controller 14 may determine that port 12*a* forwarded a frame to controller 14 that was later dropped because of an ingress violation. Controller 14 may then send a cache update to port 12*a* instructing port 12*a* to add an entry for this drop condition to cache 22*a*. In some embodiments, controller 14 adds the entry to cache 22 directly. The entry may specify that any frame received by port 12*a* that has a source address from VLAN group C should be dropped. With this entry in cache 22*a*, port 12*a* may subsequently make drop decisions locally with respect to future frames having a similar violation.

While the preceding examples provide details with respect to a particular method of handling a received frame exhibiting an ingress violation, switch 10 contemplates its elements handling a variety of types of violations using the described techniques or similar techniques.

Controller 14 may also update the filtering information stored by cache 22 in response to changes in filtering or routing information maintained by switch memory 16. In some embodiments, after an update to the filtering or routing information, such as a change in VLAN membership, controller 14 determines which ports 12 should receive a cache update. Controller 14 then sends the cache update to the appropriate ports 12. In other embodiments, controller 14 sends a cache update to all ports 12. Upon receiving the update, port 12 compares the filtering information contained in the update with the information maintained by port 12 in cache 22. If port 12 currently has an entry in cache 22 corresponding to the update's information, port 12 updates the entry in cache 22 according to the cache update received. If port 12 does not have a corresponding entry in cache 22, port 12 may choose to take no action upon receiving the cache update.

While controller 14 is illustrated and described as a single element performing a variety of operations, it should be noted that this is a logical depiction used to facilitate explanation of operations within switch 10, and the functionality of controller 14 may be provided by any suitable collection and arrangement of components or logic. For example, operations described as being performed by controller 14 may be performed by ports 12, switch memory 16, or any other components or logic in switch 10. In this description, controller 14 is intended to include, describe, and reference any controlling logic or circuitry of switch 10.

In the illustrated embodiment, switch 10 also includes switch memory 16. Switch memory 16 is shown as including a frame buffer 24, a forwarding database 26, and firmware 28. While information located in switch memory 16 is graphically depicted as individual files, folders, or other storage elements, it is understood that the information described can be stored in any appropriate manner. Thus switch memory 16 represents any suitable hardware, including appropriate controlling logic, for storing information.

Frame buffer 24 stores frames within switch core 30 while controller 14 determines appropriate handling of the frames. In particular, frame buffer 24 may store frames while controller 14 determines one or more outbound ports for receiving the frames or determines that frames should be dropped. In particular embodiments, frame buffer 24 may separately store headers and payloads of frames, or may separately store copies of the headers from frames. This may enable controller 14 to separate and quickly operate on the information contained in the headers. In some embodiments, frame buffer 24 receives a frame or the payload of the frame directly from one of ports 12. In particular embodiments, the header of the frame is processed by the switch core 30 while the frame is being received from port 12. Accordingly, switch core 30 may make a drop decision upon the header without the need to store the frame in frame buffer 24. While depicted as one logical element in switch memory 16, it is understood that frame buffer 24 may be constructed in a variety of ways and may store information in any appropriate manner.

Forwarding database 26 maintains forwarding and routing information to control the switching of frames between ports 12. For example, forwarding database 26 may include a table or other suitable information construct that enables forwarding of received frames between ports 12 based on addressing information in the frames. Controller 14 may thus access forwarding database 26 to obtain routing information for frames. In addition, forwarding database 26 may indicate drop conditions. For example, forwarding database 26 may include a number of entries specifying various types of drop conditions.

In particular embodiments, forwarding database 26 is organized into a plurality of entries, with some entries specifying the appropriate output port 12 or ports 12 for a frame with a particular destination address. The entries may indicate drop conditions, which may specify a variety of actions to be performed, such as: drop frame, drop frame if the frame is not a Bridge Protocol Data Unit (BPDU) frame (i.e. a configuration frame), drop frame but allow learning, and forward frame on the appropriate outbound port 12 or ports 12. The entries may also indicate that frames with particular addressing information should be discarded. For example, each entry may specify a VLAN address. Controller 14 may access the entry corresponding to VLAN addresses specified by the header of the frame. If the entries do not indicate that the frame should be dropped, controller 14 controls the transfer of the frame from frame buffer 24 to one or more appropriate outbound ports 12 specified by the entry corresponding to the destination address in forwarding database 26.

Drop conditions are characteristics or properties of a frame that cause switch 10 to determine that a frame should be dropped. For example, drop conditions for a VLAN environment can include: the VLAN table entry corresponding to a VLAN address in the frame is invalid; the VLAN membership is all-zero; the VLAN membership is "one-hot" (includes only one member); and the port state for MSTP requires filtering at the input port. These are only particular examples, however, and drop conditions may include any characteristics or properties of a frame that may cause switch 10 to determine that a frame should be dropped. In other embodiments, aspects or characteristics of a frame other than its addresses are checked for drop conditions. In particular embodiments, controller 14 detects drop conditions present in a frame by accessing forwarding database 26. Controller 14 may then direct the deletion of the dropped frame from frame buffer 24. Deletion from the frame buffer 24 may include erasing the frame or merely indicating that the frame's storage location is now available. In certain embodiments, controller 14 accesses the appropriate entry or entries of forwarding database 26 and uses the returned information to determine whether the frame meets a drop condition. In particular embodiments, various actions are performed on a frame or with its data prior to dropping the frame, for example to facilitate learning.

Firmware 28 includes any suitable programs, software, hardware, logic, or circuitry capable when executed to control the operation of various elements in switch 10. Firmware 28 may be included in another part of switch 10 outside of switch memory 16. Also, firmware 28 may or may not be included in switch memory 16 or switch 10.

The particular embodiments of a system for enhanced filtering of frames illustrated and described are not intended to be all inclusive. While switch 10 is depicted as containing a certain configuration and arrangement of elements, it should be noted that this is a logical depiction, and the components and functionality of switch 10 may be combined, separated and distributed as appropriate both logically and physically. Also, the functionality of switch 10 may be provided by any suitable collection and arrangement of components. Moreover, virtually all elements of switch 10 may be implemented on a single chip. The functions performed by the various components of switch 10 may be accomplished by any suitable devices or logic to provide enhanced filtering of frames by allowing ports 12 to make limited filtering decisions.

Figure 2:
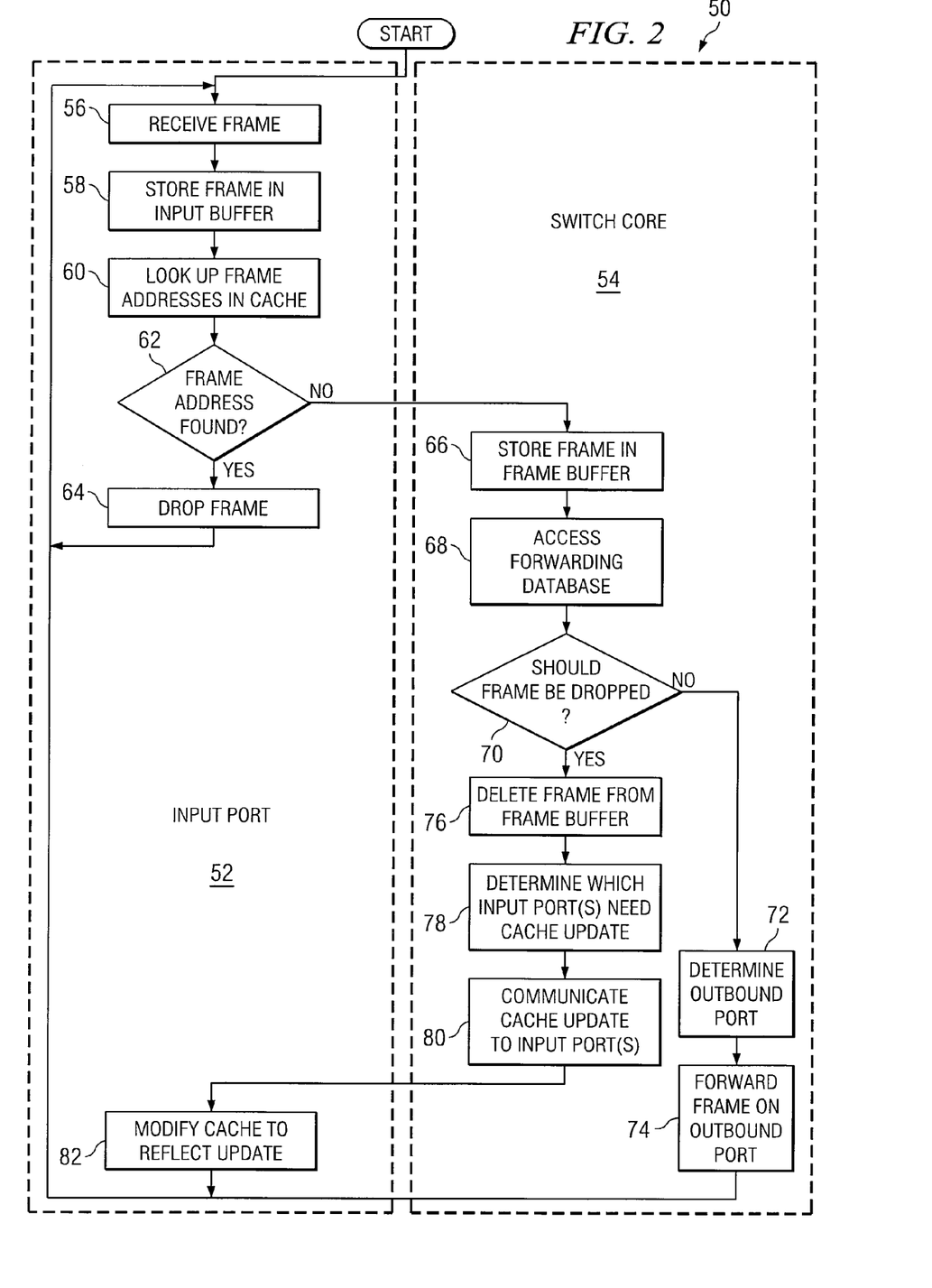
FIG. 2 is a flowchart illustrating a method of filtering frames at an input port of a switch by enabling frame drop decisions at the input port.

FIG. 2 is a flowchart illustrating a method 50 of enhanced filtering of frames by enabling frame drop decisions at the input port 12. On the left 52, the method 50 shows operations of and functions performed at a particular input port 12. On the right 54, the method 50 shows operations of and functions performed by switch core 30. In some embodiments, these operations and functions are performed by controller 14 and/or switch memory 16.

Input port 12 receives a frame, step 56. The frame is stored in input buffer 20 at step 58. Then, at step 60, input port 12 looks up one or more addresses in the header of the frame in cache 22 in order to determine whether cache 22 has an entry corresponding to those aspects of the frame header. In other embodiments, input port 12 looks up other aspects of the frame in cache 22 to determine whether cache 22 has an entry corresponding to the frame. In step 62, input port 12 determines whether any of the addresses in the frame header correspond to an entry in cache 22. If so, input port 12 drops the frame at step 64. In some embodiments, input port 12 drops the frame by deleting the frame from input buffer 20, which may be accomplished using any appropriate techniques. In other embodiments, cache 22 specifies a different operation or function to be performed on the frame. For example, cache 22 may specify that the frame's source address should be sent to forwarding database 26 for dynamic learning. Also, cache 22 may specify that all frames except for BPDU frames should be dropped. As another example, cache 22 may specify that the frame should be returned on input port 12. It is understood that cache 22 may specify any appropriate action to be taken on frames that correspond to entries in cache 22. If the frame address does not correspond to an entry in cache 22, the method 50 proceeds to step 66.

In step 66, switch core 30 receives the frame from input port 12 and stores the frame in frame buffer 24. Controller 14 accesses addressing information in the frame header and corresponding addressing entries in forwarding database 26 in step 68. Based on the addressing information from forwarding database 26, controller 14 determines whether the frame should be dropped in step 70. If controller 14 determines the frame should not be dropped in step 70, controller 14 identifies the appropriate outbound port(s) 12 for the frame based on the information in forwarding database 26. Then, controller 14 forwards the frame on the outbound port 12 in step 74, and the method 50 returns to step 56, where input port 12 receives frames.

If, in step 70, controller 14 determines that the frame should be dropped, controller 14 deletes the frame from frame buffer 24 in step 76. Whether or not a frame should be dropped may be based on the type of frame. For example, a frame may satisfy a drop condition except for the fact that it is a configuration frame. In this case, controller 14 may determine that, because it is a configuration frame, the frame should not be dropped. Additionally, controller 14 may perform additional operations on the frame or with its data, similar to that described with respect to cache 22. Then, in step 78, controller 14 determines which input port or ports 12 should receive a cache update. After making this determination, controller 14 communicates a cache update to those input port(s) 12 in step 80. After receiving the update, input port(s) 12 modify cache 22 to incorporate update received from controller 14. In some embodiments, cache 22 is modified by adding an entry to cache 22, deleting an entry from cache 22, and/or changing an entry in cache 22. Then, the method 50 returns to step 56, where an input port 12 receives frames.

The method described with respect to FIG. 2 is merely illustrative, and it is understood that the manner of operation and devices indicated as performing the operations may be modified in any appropriate manner. For example, while controller 14 is described as conducting many operations in method 50, it is understood that the functions described as being performed by controller 14 can be accomplished by any suitable elements or logic. Also, while the method describes particular steps performed in a specific order, it should be understood that switch 10 contemplates any suitable collection and arrangement of elements performing some, all, or none of these steps in any operable order.

Figure 3:
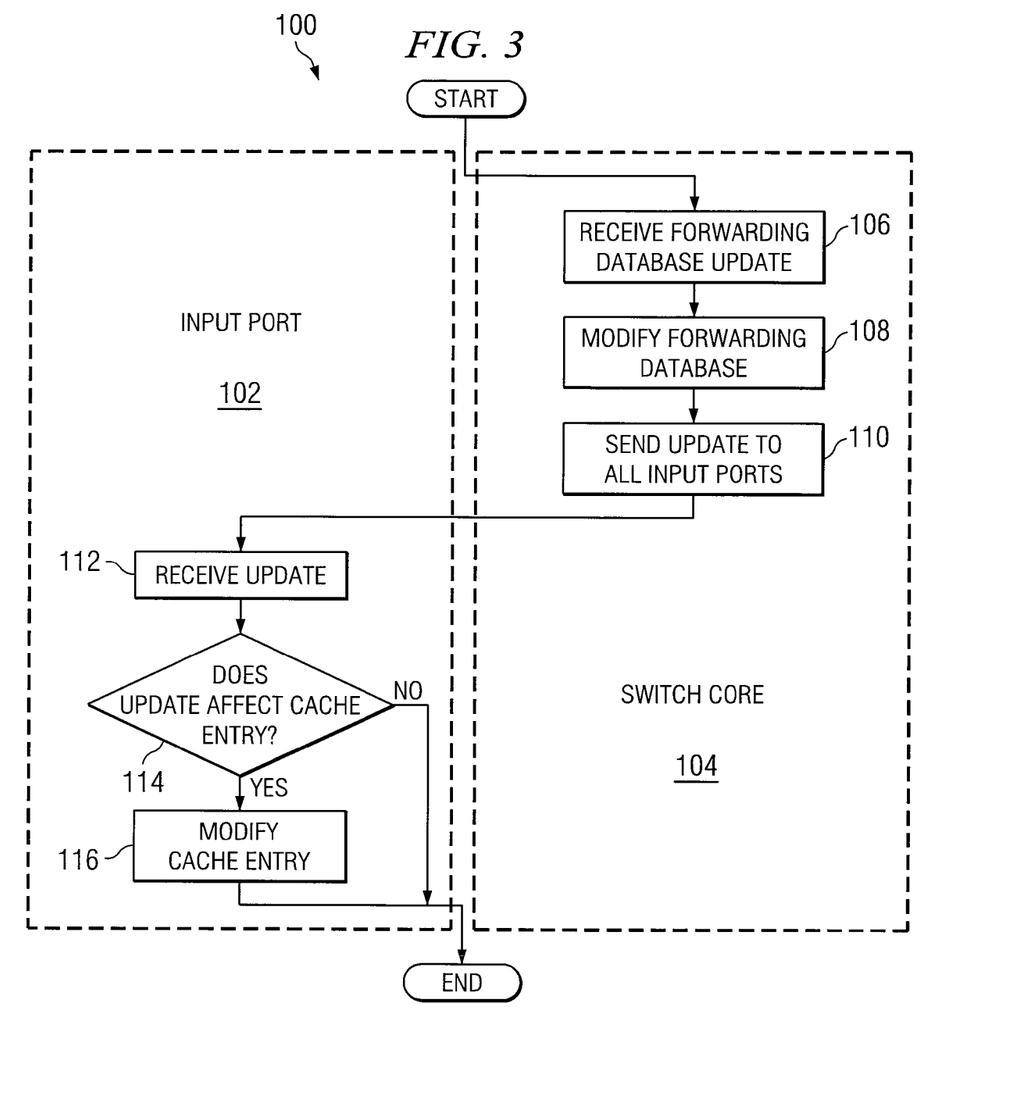
FIG. 3 is a flowchart illustrating a method of updating the cache of an input port to reflect an update to the forwarding database.

FIG. 3 is a flowchart illustrating a method 100 of updating cache 22 corresponding to one of input ports 12 to reflect an update to forwarding database 26. On the left 102, the method 100 shows operations of and functions performed at input port 12. On the right 104, the method 100 shows operations of and functions performed at switch core 30. In some embodiments, these operations and functions are performed by controller 14 and/or switch memory 16.

In step 106, controller 14 receives a forwarding database update. The forwarding database update may modify filtering or routing information stored by forwarding database 26. Controller 14 then modifies forwarding database 26 to reflect the update received at step 108. In step 110, controller 14 sends an update to all of input ports 12. The update sent to ports 12 communicates the update to forwarding database 26 located in switch memory 16. In other embodiments, controller 14 determines which of input ports 12 should receive the update and sends the update to only those of input ports 12.

In step 112, input port 12 receives the update. Then, input port 12 determines whether the update affects an entry in cache 22 at step 114. If no entry in cache 22 is affected by the update, then method 100 ends. If the update does affect an entry, input port 12 modifies the cache entry in accordance with the update, step 116. Input port 12 may modify the cache entry by changing the entry, deleting the entry, and/or adding a new entry. After the entry in cache 22 has been modified, method 100 ends.

In particular embodiments, the methods described with respect to FIGS. 2 and 3 are coordinated so that the ordering of operations at forwarding database 26 and at ports 12 is mirrored to maintain coherency between forwarding database 26 and caches 22 in each of ports 12. For example, if forwarding database 26 is accessed (as in step 68 of FIG. 2) and then forwarding database 26 is modified (as in step 108 of FIG. 3), then cache 22 should receive the results of the access and the modification (step 82 of FIG. 2 and step 116 of FIG. 3, respectively) in the same order as forwarding database 26 was accessed and modified. In some embodiments, this may be accomplished by providing only one communication path between forwarding database 26 and a particular cache 22. However, any method and or design that ensures cache coherency can be implemented to coordinate the methods of FIGS. 2 and 3.

The method described with respect to FIG. 3 is merely illustrative, and it is understood that the manner of operation and devices indicated as performing the operations may be modified in any appropriate manner. While the method describes particular steps performed in a specific order, it should be understood that switch 10 contemplates any suitable collection and arrangement of elements performing some, all, or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A switching device comprising:
   a plurality of ports, each of the ports comprising a cache having one or more filtering entries, each of the ports operable to receive a frame, the frame including a payload and a header specifying addressing information, to determine whether the addressing information corresponds to one of the filtering entries, to drop the frame if the addressing information corresponds to one of the filtering entries, and to forward the frame to a switching core if the addressing information does not correspond to one of the filtering entries; and
   the switching core comprising:
      a frame buffer operable to store the frames forwarded from the ports;
      a forwarding database operable to maintain a plurality of routing entries, each entry indicating either one of or both an outbound one of the ports and a drop condition; and
      a controller operable, for each of the frames in the frame buffer, to identify the addressing information from the header of the frame stored in the frame buffer, to identify one of the routing entries in the forwarding database corresponding to the addressing information, if the corresponding routing entry indicates an outbound one of the ports, to forward the frame to the indicated outbound one of the ports, and if the corresponding routing entry indicates a drop condition, to drop the frame and to communicate a cache update indicating the drop condition to a port of the plurality of ports that received the frame.

2. The switching device of claim 1, wherein each of the ports is further operable to update selected ones of the filtering entries in response to cache updates.

3. The switching device of claim 1, wherein the switching device is implemented on a single chip, with each of the ports capable of operating at greater than or equal to ten gigabits per second.

4. The switching device of claim 1, wherein:
   the controller is further operable to receive an update to the forwarding database, to modify the forwarding database in response to the update, to determine that the update modifies at least one drop condition indicated by one of the routing entries, and to communicate a cache update indicating the modified drop condition to one or more of the ports;
   the one or more of the ports receiving the cache update indicating the modified drop condition are further operable to update routing entries in response to the cache update; and
   the ordering of operations at the forwarding database and at the ports is mirrored to maintain coherency between the forwarding database and the cache in each of the ports.

5. The switching device of claim 1, wherein at least one of the drop conditions corresponds to a virtual local area network (VLAN) addressing violation or a MSTP port state violation.

6. The switching device of claim 5, wherein the VLAN addressing violation comprises an ingress port VLAN addressing violation or an egress port VLAN addressing violation.

7. The switching device of claim 1, wherein:
   the addressing information includes a source address and a destination address; and
   the controller is further operable to access the forwarding database to determine whether source address or the destination address has a drop condition.

8. A method of processing frames comprising:
   receiving a frame at a port of a switch, the frame including a payload and a header specifying addressing information;
   maintaining a plurality of filtering entries in a cache associated with the port;
   determining whether the addressing information corresponds to one of the filtering entries,
   dropping the frame if the addressing information corresponds to one of the filtering entries;
   forwarding the frame to a switching core if the addressing information does not correspond to one of the filtering entries;
   storing frames forwarded from the port and a plurality of other ports in a frame buffer within the switching core;
   maintaining a plurality of routing entries at a forwarding database, each entry indicating either one of or both an outbound one of the ports and a drop condition; and
   for each of the frames in the frame buffer:
      identifying the addressing information from the header of the frame,
      identifying one of the routing entries in the forwarding database corresponding to the addressing information,
      if the corresponding routing entry indicates an outbound one of the ports, forwarding the frame to the indicated outbound one of the ports, and
      if the corresponding routing entry indicates a drop condition, dropping the frame and communicating a cache update indicating the drop condition to the port that received the frame.

9. The method of claim 8, further comprising updating the filtering entries in the ports in response to receiving cache updates.

10. The method of claim 8, further comprising:
    receiving an update to the forwarding database;
    modifying the forwarding database in response to the update;
    determining that the update modifies at least one drop condition indicated by one of the routing entries;
    communicating a cache update indicating the modified drop condition to the port;
    in response to the cache update, updating routing entries in the port receiving the cache update; and
    mirroring the ordering of operations at the forwarding database and at the ports to maintain coherency between the forwarding database and the cache in each of the ports.

11. The method of claim 8, wherein at least one of the drop conditions corresponds to a virtual local area network (VLAN) addressing violation or a MSTP port state violation.

12. The method of claim 11, wherein the VLAN addressing violation comprises an ingress port VLAN addressing violation or an egress port VLAN addressing violation.

13. The method of claim 8, further comprising:
accessing the forwarding database to determine whether one of a source address and a destination address has a drop condition;
wherein the addressing information includes the source address and the destination address.

14. Software for processing frames, the software embodied in a computer-readable medium and operable when executed to:
receive a frame at a port of a switch, the frame including a payload and a header specifying addressing information;
maintain a plurality of filtering entries in a cache associated with the port;
determine whether the addressing information corresponds to one of the filtering entries,
drop the frame if the addressing information corresponds to one of the filtering entries;
forward the frame to a switching core if the addressing information does not correspond to one of the filtering entries;
store frames forwarded from the port and a plurality of other ports in a frame buffer within the switching core;
maintain a plurality of routing entries at a forwarding database, each entry indicating either one of or both: an outbound one of the ports and a drop condition; and
for each of the frames in the frame buffer:
identify the addressing information from the header of the frame,
identify one of the routing entries in the forwarding database corresponding to the addressing information,
if the corresponding routing entry indicates an outbound one of the ports, forward the frame to the indicated outbound one of the ports, and
if the corresponding routing entry indicates a drop condition, drop the frame and communicate a cache update indicating the drop condition to the port that received the frame.

15. The software of claim 14, further operable to update the filtering entries in the port in response to cache updates.

16. The software of claim 14, further operable to:
receive an update to the forwarding database;
modify the forwarding database in response to the update;
determine that the update modifies at least one drop condition indicated by one of the routing entries;
communicate a cache update indicating the modified drop condition to the port;
in response to the cache update, update routing entries in the port receiving the cache update; and
mirror the ordering of operations at the forwarding database and at the ports to maintain coherency between the forwarding database and the cache in each of the ports.

17. The software of claim 14, wherein at least one of the drop conditions corresponds to a virtual local area network (VLAN) addressing violation or a MSTP port state violation.

18. The software of claim 17, wherein the VLAN addressing violation comprises an ingress port VLAN addressing violation or an egress port VLAN addressing violation.

19. The software of claim 14, further operable to:
access the forwarding database to determine whether one of a source address and a destination address has a drop condition;
wherein the addressing information includes the source address and the destination address.

20. A system for processing frames comprising:
means for receiving a frame at a port of a switch, the frame including a payload and a header specifying addressing information;
means for maintaining a plurality of filtering entries in a cache associated with the port;
means for determining whether the addressing information corresponds to one of the filtering entries,
means for dropping the frame if the addressing information corresponds to one of the filtering entries;
means for forwarding the frame to a switching core if the addressing information does not correspond to one of the filtering entries;
means for storing frames forwarded from the port and a plurality of other ports in a frame buffer within the switching core;
means for maintaining a plurality of routing entries at a forwarding database, each entry indicating either one or both an outbound one of the ports and a drop condition; and
means for, for each of the frames in the frame buffer:
identifying the addressing information from the header of the frame,
identifying one of the routing entries in the forwarding database corresponding to the addressing information,
forwarding the frame to the indicated outbound one of the ports if the corresponding routing entry indicates an outbound one of the ports, and
if the corresponding routing entry indicates a drop condition, dropping the frame and communicating a cache update indicating the drop condition to the port that received the frame.

* * * * *